United States Patent
Kincaid

(10) Patent No.: US 8,190,441 B2
(45) Date of Patent: May 29, 2012

(54) PLAYBACK OF COMPRESSED MEDIA FILES WITHOUT QUANTIZATION GAPS

(75) Inventor: William S. Kincaid, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 875 days.

(21) Appl. No.: 11/519,389

(22) Filed: Sep. 11, 2006

(65) Prior Publication Data

US 2008/0065393 A1 Mar. 13, 2008

(51) Int. Cl.
*G10L 21/00* (2006.01)

(52) U.S. Cl. ........ 704/502; 704/500; 704/501; 704/503; 704/504; 375/240; 700/94

(58) Field of Classification Search .......... 704/500–504; 341/50; 348/512; 700/94; 375/240
See application file for complete search history.

(56) References Cited

U.S. PATENT DOCUMENTS

| | | | | |
|---|---|---|---|---|
| 6,226,616 | B1 * | 5/2001 | You et al. | 704/500 |
| 6,285,405 | B1 * | 9/2001 | Binford et al. | 348/512 |
| 6,330,286 | B1 * | 12/2001 | Lyons et al. | 375/240.28 |
| 6,721,710 | B1 * | 4/2004 | Lueck et al. | 704/500 |
| 6,903,664 | B2 * | 6/2005 | Schroder et al. | 341/50 |
| 7,289,963 | B2 * | 10/2007 | Iwasaki et al. | 704/500 |
| 7,516,230 | B2 * | 4/2009 | Sperschneider et al. | 709/231 |
| 2002/0080779 | A1 * | 6/2002 | LeBlanc | 370/352 |
| 2003/0045957 | A1 * | 3/2003 | Haberman et al. | 700/94 |
| 2003/0079038 | A1 | 4/2003 | Robbin et al. | |
| 2004/0268451 | A1 | 12/2004 | Robbin et al. | |
| 2005/0021478 | A1 | 1/2005 | Gautier et al. | |
| 2005/0050345 | A1 | 3/2005 | Dowdy et al. | |

OTHER PUBLICATIONS

Schroeder et al., "Original File Length (OFL) for mp3, mp3PRO and other Audio Codecs", Audio Engineering Society Convention Paper 5830, Mar. 2003, 6 pages.

* cited by examiner

*Primary Examiner* — Qi Han
*Assistant Examiner* — Mark Villena

(57) ABSTRACT

Playback by a decoder of a lossy compressed digital media file without quantization gaps is disclosed. The digital media file can be formed of a number of audio samples grouped into a corresponding number of audio frames. As a method, one embodiment can be carried out by identifying an encoder used to compress the digital media file; obtaining an encoder delay value for the identified encoder; obtaining a decoder delay value for the decoder; determining a audio sample count corresponding to a last valid audio sample; setting a re-synchronization after seek option marker N audio frames from the last valid audio sample; and decoding valid audio samples using the encoder delay value, the decoder delay value, and the sample count corresponding to the last valid audio sample.

18 Claims, 3 Drawing Sheets

PLAYBACK OF COMPRESSED MEDIA FILES WITHOUT QUANTIZATION GAPS

BACKGROUND OF THE INVENTION

1. Field of the Invention

This invention relates generally to digital media files. More specifically, the invention describes playback of compressed digital media files that is substantially free of quantization gaps.

2. Description of Related Art

Recent developments in consumer electronics have included the introduction of multimedia asset player devices (such as the iPOD™ player manufactured by Apple Computer Inc. of Cupertino, Calif.) capable so storing a large number of digital data files such as audio or video files. In some cases, in order to store an ever larger number of data files, various data compression techniques have been used to reduce the size of the stored digital data files. These compression techniques fall into one of two categories, lossless compression (i.e., WAV) that is a class of data compression algorithms that allow the exact original data to be reconstructed from the compressed data or lossy data compression (AAC, MP3) that is a class of data compression algorithms that do not allow the exact original data to be reconstructed from the compressed data.

In either case, in order to encode a raw audio file into a compressed digital format, the audio data must be quantized into digital audio samples. Encoders and decoders reducing the bitrate of a digital audio signal (like MPEG1/2/4-Audio, Dolby Digital AC-3, MP3, ATRAC, Windows Media Audio WMA or Real Audio) typically operate with short-time frequency-domain representations of the signal. In order to convert the signal into this domain, typically a number (e.g. 128, 256, 512, 1024 and 1152) of signal elements are grouped together (referred to as frames or blocks) and thereafter transformed into the frequency domain. Due to the block-based short time transform processing, or the use of filters for splitting the signal into frequency bands, a delay will be introduced. For example, for an audio signal consisting of a single sample value $S_0$ at time instant $t_0$, after encoding and decoding, a signal appears at the decoder output that likewise consists of an individual sample value $S_0$, this sample value however is no longer located at time instant $t_0$ but being shifted.

Furthermore, when encoding a signal of arbitrary length, a typical audio encoder either discards some part of the audio signal at its end or fills up the audio signal with a number of zero-valued samples (stuffing bits). As a result, the length (i.e. the quantity of samples or coefficients) of any encoded or decoded audio signal can be a multiple only of a further multiple of the initial time element mentioned above, i.e. a multiple of the frame or block length that is required by the encoding or decoding process. For example, after a file has been encoded by an encoder, the encoder buffers are "flushed" in preparation for a next file by stuffing a number of dummy samples through the buffers resulting in an encoder dependent "encoding drain" gap in addition to the encoder/decoder delay already discussed. Therefore digital audio files having undergone lossy compression rarely have the same length as the original audio signal (see FIG. 1) having a number of quantization gaps that, in part, are dependent upon the particular encoder used.

Unfortunately, however since a user typically has no apriori knowledge of the particular encoder used to compress a particular file, the user cannot easily compensate for the various quantization gaps and unless these non-audio samples are identified and removed (or otherwise not decoded), resulting in audible distortion (such as a "click" or "pop") during the transition from one track to another that can prove to be distracting at best. It has become very popular playing back a compressed version of an album which was gapless to begin with, like "Dark Side of the Moon" (other examples are classical albums such as Beethoven's 9th symphony, in which the final movement is typically divided into more than one track but the music itself is continuous) by placing selected digital audio files in a pre-selected order and performing what is referred to as a butt splice. A butt splice is the abrupt connection of one audio file to another audio file so that they become one continuous audio file (along the lines of concept albums such as "Dark Side of the Moon"), which can then, for example, be burned onto a playable storage medium such as a CD. It would therefore be advantageous to be able to perform a distortion free butt splice on any two compressed audio files without requiring a user to have knowledge of the particular encoder(s) used to compress the files in the first place.

Unfortunately, however, if the non-audio samples present at the beginning and the ending of a lossy compressed digital file are not removed, any attempt to butt splice these files together will most likely create an audible distortion (such as a click or a pop) at the junction.

What is required is a method, system, and apparatus for identifying and removing non-audio samples in playback of a digital file that has been compressed using a lossy compression algorithm.

SUMMARY OF THE INVENTION

The invention described herein pertains to playback by a decoder of a lossy compressed digital media file without quantization gaps. The digital media file can be formed of a number of audio samples grouped into a corresponding number of audio frames. As a method, one embodiment can be carried out by identifying an encoder used to compress the digital media file; obtaining an encoder delay value for the identified encoder; obtaining a decoder delay value for the decoder; determining an audio sample count corresponding to a last valid audio sample; setting a re-synchronization after seek option marker N audio frames from the last valid audio sample; and decoding valid audio samples of the digital media file based on at least the encoder delay value, the decoder delay value, and the sample count corresponding to the last valid audio sample.

In another embodiment, computer program product executable by a processor for playback by a decoder of a lossy compressed digital media file without quantization gaps, wherein the digital media file is formed of a number of audio samples grouped into a corresponding number of audio frames. The computer program product can include computer code for identifying an encoder used to compress the digital media file; computer code for obtaining an encoder delay value for the identified encoder; computer code for obtaining a decoder delay value for the decoder; computer code for determining an audio sample count corresponding to a last valid audio sample; computer code for setting a re-synchronization after seek option marker N audio frames from the last valid audio sample; computer code for decoding valid audio samples of the digital media file based on at least the encoder delay value, the decoder delay value, and the sample count corresponding to the last valid audio sample; and computer readable medium for storing the computer code.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Figure 1:
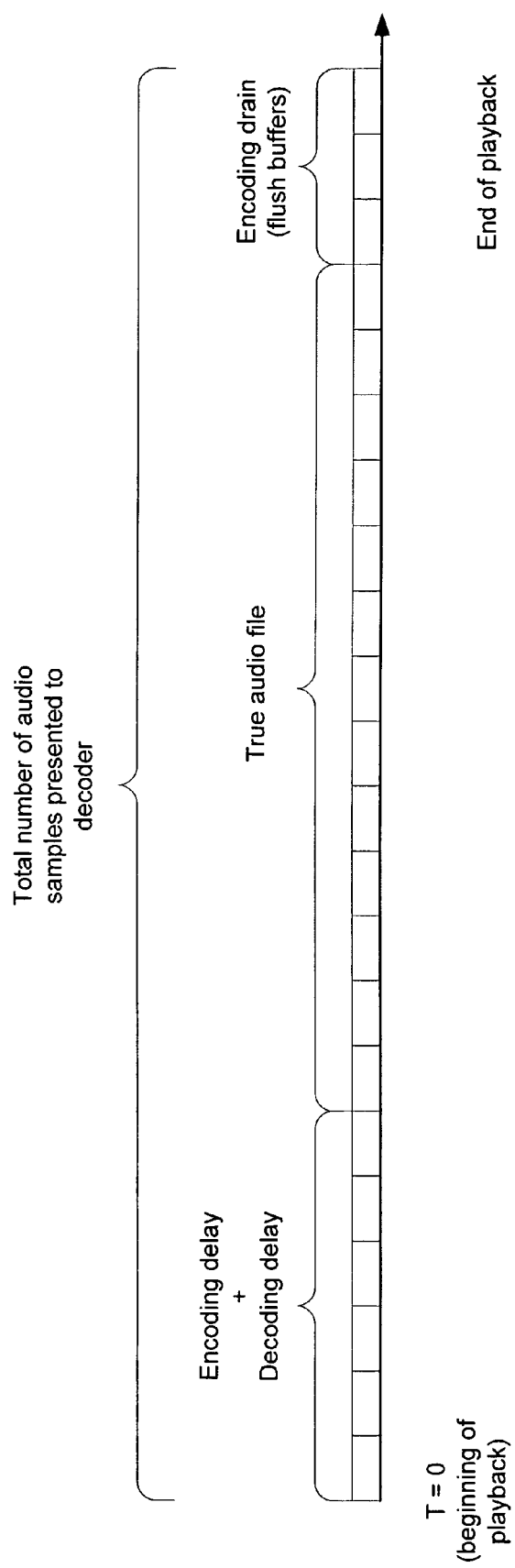
FIG. 1 shows a representative compressed digital file.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

According to the invention, encoder information (encoder delay value, inferred encoding drain value) specific to an identified encoder in addition to information about the exact length of the original signal are transferred together with the encoded audio information when broadcasting or when recording on or replay from a storage medium. The length value information can be determined after the file has been encoded and is inserted into the encoded audio bit stream (e.g. using the ancillary data field as defined in the MPEG Audio standard ISO/IEC 11172-3) or the information can be stored in a separate data file associated with the digital media file for subsequent use by a decoder. The length information sent can have different forms: absolute number of audio samples of the program or track or encoding unit; number of audio frames of the program or track or encoding unit, number of samples to be cut off at the start and/or at the end of the program or track or encoding unit. In a particularly useful implementation, the invention provides a re-synchronization after seek option that maintains a sample accurate play position after a seek command has been initiated by identifying and marking a location in the file that is a preset number of frames from the end of the last true audio sample in the digital audio file. In this way, once the decoder has reached this resynchronization marker, the decoder knows that it is a predetermined number of frames from the end of the file. This is particularly well suited for those devices that take advantage of a user interface (UI) that displays a progress display indicating a current play position of the file currently to be played back.

In addition to the length of valid audio data, an information value can be transferred that represents the total encoder delay. The decoder can extract these items of information and adjust the length at the beginning of the decoded signal by cutting off samples (decoding delay and encoding delay) at the start and/or at the end of the program (encoding drain) or track or decoding unit output. However, one implementation of the invention that is particularly well suited for thin client devices, such as portable personal media players along the lines of the iPod™ manufactured by Apple Computer, Inc. of Cupertino, CA having limited on-board memory, the end of the file can be accurately located by providing a counter that tracks a current sample location (as current sample number, for example) and when the current sample number value equals the known length of the digital file, the remaining samples are merely dropped.

In studio sound or audio processing, the available analog audio signals (e.g. at the output of microphone amplifiers) are converted into digital signals, applying the principles of sampling and quantization. 'Sampling' means that signal amplitude values are taken in regular intervals. The reciprocal value of the temporal intervals is the sampling rate. According to the Nyquist or sampling theorem the original content of the sampled signals can be recovered error-free if they contain maximum frequencies up to half the sampling rate only. Typical sampling rates used in audio processing are e.g. 44.1 kHz or 48 kHz, which correspond to sampling intervals or clocks of 22.67 μs or 20.83 μs, respectively. 'Quantization' means that a reduced quantity of amplitude values is assigned to the basically finely resolved signal sample values, according to a quantization characteristic. Thereby the resolution of the amplitude values becomes limited and the irreversible loss of information detail in the correspondingly inverse quantized values cannot be avoided. For example, a 16-bit amplitude value range extends from −32768 to +32767, and is also called 16-bit quantization or 16-bit PCM (pulse code modulation). A two-channel audio signal that was sampled with 44.1 kHz sampling frequency and quantized with 16 bits leads to 1411200 bits per second to be processed. In the decoder, a corresponding inverse transformation or inverse sub-band filtering, respectively, is carried out in order to re-enter the time domain. The transformation is usually carried out on input sample blocks having lengths that fully or partly correspond to an integral power of "2" (e.g. 128, 256, 512, 1024 or 1152 values as mentioned above) for computational simplification.

The resulting coded signal representations are arranged in corresponding frames according to standardized rules, whereby the frames contain strongly signal-dependent binary signals. These frames usually contain sections with important control information (e.g. data packet header information with, side information) and sections with less important however strongly signal-adaptive frequency coefficient information called 'main information'. Because the quantity of information to be transmitted varies strongly depending on the audio signal characteristic and practically never completely fills the capacity of the frames, the frames can also contain parts that represent no standardized useful information. These parts are called for instance 'ancillary data' or meta data and can be used freely for different purposes that if not removed or otherwise identified by the decoder, can result in audio distortions during playback.

The invention is well suited for playing back lossy compressed digital audio files without discernable audio distortion as well as for preparing lossy compressed audio files for a butt splice operation resulting in a continuous playback from one track to another. This is particularly useful in those situations where a user desires to seamlessly join a number of tracks into an album having no discernible audio gaps between the joined tracks.

It should be noted that for the remainder of this discussion, the invention will be described in terms of MP3 type data compression for the sake of simplicity. However, the reader should be aware that the invention is well suited for use with any digital media files that have undergone lossy compression of which MP3 is but one example.

Figure 2:
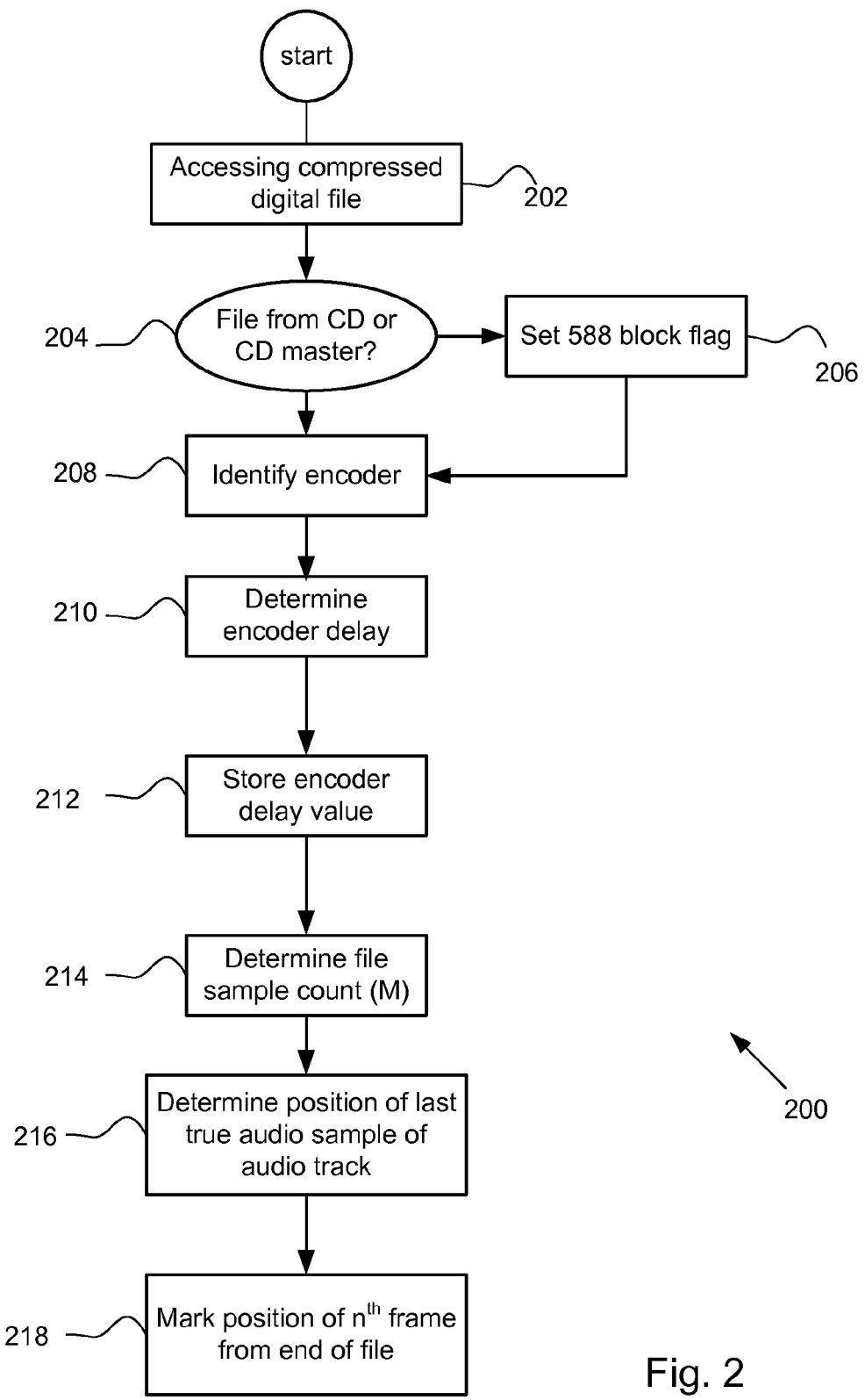
FIG. 2 shows a flowchart detailing a process in accordance with an embodiment of the invention.

FIG. 2 shows a flowchart detailing a process 200 for characterizing a compressed digital file in accordance with an embodiment of the invention. The process 200 begins at 202 by accessing a digital file. The digital file to be characterized can be accessed from any number or type of storage devices or in some cases the digital file can be broadcast or otherwise received wirelessly from a source device. Next, at 204, a determination is made whether or not the file source material was a CD or CD master (in which case the file will be encoded based upon 588 sample blocking). Determining if the file was derived from a CD or CD master, can be done in any number of ways. For example, if the file was retrieved from an online music store then the original source file is presumed to be CD or CD master. Alternatively, by querying metadata stored in a first few frames of the digital file can reveal the existence, or not, of a CDDB ID3 tag indicating whether or not the file source material was a CD or CD master. If it is determined that the digital file source material was a CD or CD master, then a 588 sample block flag is set at 206 indicating that the digital file has a frame structure based upon a 588 audio sample block size consistent with a CD format file.

In any case, if the nature of the source material has been determined, the particular encoder used to compress the original uncompressed raw audio is identified at 208. Once the particular encoder has been identified, an encoder delay value associated with that particular encoder is stored as metadata at 212. The identity of the encoder can be accomplished in any number of ways. For example, if the digital file includes a metadata tag included in the first few frames, then the tag typically identifies the particular encoder used to compress the file. Alternatively, if there is no tag found, and if the file is a variable bit rate (VBR) type file, then by convention the first frame includes a VBR descriptor that typically includes a text field that identifies the encoder. Yet another approach relies upon querying a vendor ID (for any files retrieved from a music store) that can be used with a look up table to determine the particular encoder and the encoder delay associated therewith. This particular approach may, however, be problematic since a particular vendor may change the encoder used at any time. Still another approach is based upon the fact that a particular encoder has a signature that can be used to infer the encoder used to create the compressed digital file. A good example of this is in AAC files, where there are alternative possible window shapes for the filtering step used in transformation between the time and frequency domains. It is possible to differentiate between encoders which are otherwise similar by determining which window shape is used (sine or KBD, that is, "Kaiser-Bessel derived").

Once the encoder has been identified, the encoder delay associated with the identified encoder is established at 210, using, for example, a look up table. At 214, the total sample count for the file (M) is established that includes all quantization gaps. This can be accomplished by fast decoding of the first frames of the file (some of which may be non-audio frames) until a first known valid audio frame is found. Once the sample count corresponding to the first known audio sample is established, the end of the file can be estimated by, for example, examining any metadata tags included in the first non-audio frames by the encoder that identifies the end of the file and jumping to that position in the file. In some cases, metadata tags installed by the encoder are different at the beginning and the end of the file, therefore, another approach used to determine the end of the file is to look for the different type of metadata tags at the beginning and end of the file.

Once the end of the file has been estimated, then the total number of valid audio samples in the file can also be estimated at 214 (if a constant bit rate, or CBR, file) using the size of the file in bytes if the file is MP3 compliant. However, if the file is VBR type file, then the entire file must be decoded (either fully decoded or a fast decode) in order to establish the end of the file with any degree of certainty since each frame can be a different size. (It should be noted that by fast decode it is meant that the header of a particular audio sample is decoded only until the location of a next frame is established. In this way, only minimal computing resources are used and is therefore relatively fast).

Once an estimate of the size of the file (in audio samples) has been established, a verification is done by computing a residual value (which ideally should be close to or equal to zero). If the residual value is greater than a threshold value, then the entire file must be either fast decoded or fully decoded in order to establish the true file size.

Once the true file size (i.e., file sample count (M)) has been estimated, then a determination of the position of the last true audio sample is performed at 216. In the described embodiment, the last true audio sample can be established by decoding back to front from the end of the file (for about 1 second, for example) and looking for any discontinuities from one decoded sample to the next indicating that one of the decoded samples is non-audio and one of the samples (the sample closest to the beginning) is a true audio sample. (It should be noted that if it had been determined previously that the source material was a CD or CD master, then the audio samples decoded are spaced apart by 588 taking advantage of the knowledge that of the known 588 sample blocking format associated with CDs or CD master files).

In the described embodiment, a discontinuity can be determined by performing a percentage change calculation between two audio samples and comparing the result to a first threshold value with the idea that the last true audio sample will decode to valid audio data whereas a non-audio sample will include some form of non-audio data and therefore in all likelihood decode to a non-audio signal unrelated to the decoded audio signal resulting in a relative discontinuity between the two signals. This discontinuity can be quantified by performing a fractional change analysis between the two decoded sample values and comparing the result to the first threshold. In those cases where the comparison is greater than the first threshold, then the sample count of the sample closest to the end of the file is noted as the first non-audio sample and the process continues until all samples in the selected portion of the file are examined. If at least two discontinuities are found, then the count corresponding to the largest discontinuity is presumed to be the first non-audio sample and marks the end of the true audio data.

In those cases where no discontinuities are found (or only a single discontinuity is found) then the first threshold is reduced to a second threshold and the comparisons are performed again. If again at least two discontinuities are not found at the reduced threshold, then a failure flag is set. It should be noted, however, that in some cases, a digital file may in fact have no non-audio files at the end of the file (the music may just taper off, for example) and the fact that no discontinuities were found merely indicates that the file may actually be one such file and not a true failure in the general sense of the word. Once the value of the last true audio sample has been determined, then the encoder drain value can be inferred by evaluating the position of the last true audio sample and the end of the file, the difference being an approximation of the encoder drain value.

In a particularly useful implementation, once the location of the last true audio sample has been estimated, the invention provides a re-synchronization after seek option that maintains a sample accurate play position after a seek command has been initiated by identifying and marking a location in the file that is a preset number N (where N=8, for example) of frames from the end of the last true audio sample in the digital audio file at 218. In this way, once the decoder has reached this resynchronization marker, the decoder knows that it is a predetermined number of frames from the end of the file. This is particularly well suited for those devices that take advantage of a user interface (UI) that displays a progress display indicating a current play position of the file currently be played back.

Once the various information values (encoder delay, decoder delay, file size, and a re-synchronization after seek marker) have been established for a particular compressed digital file, the invention provides that a compliant decoder can use the values to properly decode the characterized compressed digital file in order to eliminate quantization gaps. In this way, the properly decoded audio file will not experience discernable audio distortion due to the presence of such gaps at either the end of playback or at the beginning of playback. In addition, since the compressed audio files have been properly conditioned to remove audio samples consistent with the quantization gaps, these audio files can be butt spliced in order to create gapless albums, for example.

In one embodiment, the various information values can be stored in a meta file that is uniquely associated with a particular compressed digital audio file stored in a database that can be downloaded along with the file to a media player unit. Once downloaded into the media player unit, a decoder will access the meta file having the various information values and use them to customize the decoding process resulting in a gapless rendition of the digital audio file. In another embodiment, the various information values can be encoded directly into the digital audio file itself by incorporation into one or more of the frames that form the compressed audio file.

Figure 3:
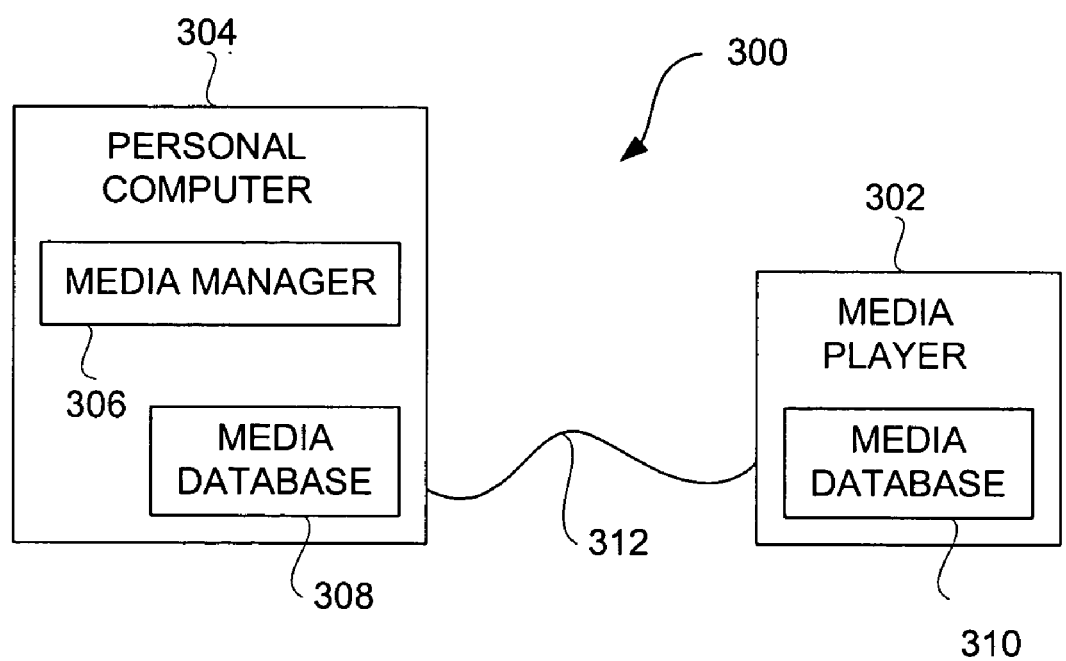
FIG. 3 shows a media system in accordance with an embodiment of the invention.

One such system is shown in FIG. 3 a media system 300 according to one embodiment of the invention. The media system 300 includes a media player 302 and a personal computer 304. The personal computer 304 includes a media manager 306. The personal computer 304 further includes a media database 308. The media player 302 includes a media database 310. Typically, the media player 302 will also include a data storage device (e.g., disk drive) for storing media content, a cache memory for storing media content in-use, a screen display for displaying information to a user, and a processor (e.g., microprocessor) for controlling operation of the media player 302.

A peripheral cable 312 provides a data path (or data link) between the media player 302 and the personal computer 304. The peripheral cable 312 provides a peripheral bus that couples the media player 302 to the personal computer 304. The peripheral bus, for example, could be a FIREWIRE bus or a Universal Serial Bus (USB). The media database 310 also allows the media player 302 to present a user interface to the user that is more sophisticated than conventional approaches. Such a user interface can be presented on the screen display of the media player 302. The user interface can, for example, allow the user of the media player 302 to browse, sort, search, play, etc. the media content resident on the media player 302. The user interface can also allow the user of the media player 302 to download (add) or delete (remove) media items from the media player 302. The media manager 306 also has a user interface that allows a user to browse, sort, search, play, make playlists, burn Compact Discs (CDs), etc. the media content resident on the personal computer 304. The user interface can also allow the user of the personal computer 304 to download (add) or delete (remove) media items from the personal computer 304.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of playback by a decoder of a lossy compressed digital media file without quantization gaps, wherein the digital media file is formed of a number of audio samples grouped into a corresponding number of audio frames, comprising:

identifying an encoder used to compress the digital media file;

obtaining an encoder delay value for the identified encoder;

obtaining a decoder delay value for the decoder;

determining an audio sample count corresponding to a last valid audio sample;

setting a re-synchronization after seek option marker N audio frames from the last valid audio sample; and decoding valid audio samples of the digital media file based on at least the encoder delay value, the decoder delay value, and the audio sample count corresponding to the last valid audio sample, wherein the determining of the audio sample count corresponding to a last valid audio sample, comprises:
(a) determining a total number M of audio samples in the digital audio file;
(b) decoding an Mth audio sample to form an Mth audio value;
(c) decoding an (M-n)th audio sample to form an (M-n)th audio value;
(d) generating a fractional change value between the Mth audio value and the (M-n)th audio value;
(e) comparing the fractional change value to a first threshold value; and
(f) updating a discontinuity counter if the fractional change value is greater than the first threshold.

2. A method as recited in claim 1, wherein the determining the audio sample count, comprises:

decoding the digital media file to establish a first valid audio sample;

estimating an end frame of the digital media file; and estimating the audio sample count corresponding to a last valid audio sample based on the first valid audio sample and the estimated end frame.

3. A method as recited in claim 1, wherein the encoder delay value, the sample count corresponding to the last valid audio sample, and the re-synchronization after seek option marker are stored in a meta file uniquely associated with the digital media file.

4. A method as recited in claim 1, wherein the encoder delay value, the sample count corresponding to the last valid audio sample, and the re-synchronization after seek option marker are encoded in the compressed digital media file by the encoder.

5. A method as recited in claim 1, wherein the identifying the encoder comprises;

if the compressed digital media file is a VBR type compressed digital media file, then reading a VBR descriptor located in a first audio frame that includes an encoder ID, otherwise, determining if any metadata is stored in any of a number of beginning audio frames;

retrieving the encoder identifier (ID) from the metadata, or retrieving a vendor ID; and using a look up table to determine the encoder ID associated with the vendor ID.

6. A method as recited in claim 5, wherein obtaining the encoder delay value comprises:

looking up the encoder delay value corresponding to the encoder ID in a data structure other than the compressed digital media file.

7. A method as recited in claim 1, wherein obtaining the decoder delay value for the decoder comprises:
looking up the decoder delay value corresponding to the decoder used to decode the compressed digital audio file.

8. A method as recited in claim 1, further comprising:
repeating (a)-(f) for a number of audio samples corresponding to approximately t seconds.

9. A method as recited in claim 8, further comprising:
if the discontinuity counter is at least two, then designating the audio sample counter corresponding to a second discontinuity as the last valid audio sample, otherwise;
reducing the first threshold value to a second threshold value; and
repeating (a)-(f) for the number of audio samples corresponding to approximately t seconds.

10. A method as recited in claim 9, further comprising:
if the discontinuity counter is at least two using the second threshold value, then designating the audio sample corresponding to the second discontinuity as the last valid audio sample otherwise;
setting a fail flag indicating that the last valid audio sample is the last audio sample in the digital file.

11. Computer program product for playback by a decoder of a lossy compressed digital media file without quantization gaps, wherein the digital media file is formed of a number of audio samples grouped into a corresponding number of audio frames, comprising:
computer code for identifying an encoder used to compress the digital media file;
computer code for obtaining an encoder delay value for the identified encoder;
computer code for obtaining a decoder delay value for the decoder;
computer code for determining an estimated audio sample count corresponding to a last valid audio sample based on the first valid audio sample and the estimated end frame;
computer code for setting a re-synchronization after seek option marker N audio frames from the last valid audio sample;
computer code for decoding valid audio samples of the digital media file based on at least the encoder delay value, the decoder delay value, and the sample count corresponding to the last valid audio sample; and
computer readable medium for storing the computer code, wherein the computer program code for determining the audio sample count corresponding to a last valid audio sample, comprises:
(a) computer code for determining a total number M of audio samples in the digital audio file;
(b) computer code for decoding an Mth audio sample to form an Mth audio value;
(c) computer code for decoding an (M-n)th audio sample form an (M-n)th audio value;
(d) computer code for generating a fractional change value between the Mth audio value and the (M-n)th audio value;
(e) computer code for comparing the fractional change value to a first threshold value; and
(f) computer code for updating a discontinuity counter if the fractional change value is greater than the first threshold.

12. Computer program product as recited in claim 11, wherein the encoder delay value, the sample count corresponding to the last valid audio sample, and the re-synchronization after seek option marker are stored in a meta file uniquely associated with the digital media file.

13. Computer program product as recited in claim 11, wherein the encoder delay value, the sample count corresponding to the last valid audio sample, and the re-synchronization after seek option marker are encoded in the compressed digital media file by the encoder.

14. Computer program product as recited in claim 11, wherein the identifying the encoder comprises:
computer code for reading a VBR descriptor located in a first audio frame that includes an encoder ID if the compressed digital media file is a VBR type compressed digital media file, then, otherwise,
computer code for determining if any metadata is stored in any of a number of beginning audio frames;
computer code for retrieving the encoder identifier (ID) from the metadata, or
computer code for retrieving a vendor ID; and
computer code for using a look up table to determine the encoder ID associated with the vendor ID.

15. Computer program product as recited in claim 14, wherein the computer program code for obtaining the encoder delay value comprises:
computer program code for looking up the encoder delay value corresponding to the encoder ID in a data structure other than the compressed digital media file.

16. Computer program product as recited in claim 11, wherein the computer code for determining an audio sample count, comprises:
computer code for decoding the digital media file to establish a first valid audio sample;
computer code for estimating an end frame of the digital media file; and
computer code for estimating the audio sample count corresponding to a last valid audio sample based on the first valid audio sample and the estimated end frame.

17. Computer program product as recited in claim 11, further comprising:
computer code for repeating (a)-(f) for a number of audio samples corresponding to approximately t seconds.

18. Computer program product as recited in claim 17, further comprising:
if the discontinuity counter is at least two, then designating the audio sample counter corresponding to a second discontinuity as the last valid audio sample, otherwise;
computer code for reducing the first threshold value to a second threshold value; and
computer code for repeating (a)-(f) for the number of audio samples corresponding to approximately t seconds.

* * * * *